United States Patent [19]
Kojima et al.

[11] Patent Number: 4,655,801
[45] Date of Patent: Apr. 7, 1987

[54] AIR DRYER UNIT

[75] Inventors: Katsumi Kojima, Yokosuka; Yuzo Ichishita, Yokohama, both of Japan

[73] Assignee: Nippon Air Brake Co., Ltd., Japan

[21] Appl. No.: 766,105

[22] Filed: Aug. 15, 1985

[30] Foreign Application Priority Data

Aug. 21, 1984 [JP] Japan .......................... 59-126809[U]

[51] Int. Cl.$^4$ ............................................. B01D 39/02
[52] U.S. Cl. ....................................... 55/218; 55/316; 55/387; 55/DIG. 17
[58] Field of Search ................. 55/218, 219, 316, 318, 55/323, 325, 356, 359, 387, 394, 395, 421, 422, 429, 430, 431, 428, 466, DIG. 17

[56] References Cited

U.S. PATENT DOCUMENTS

| | | | |
|---|---|---|---|
| 1,463,990 | 8/1923 | Wilson | 55/DIG. 17 |
| 2,322,603 | 6/1943 | Thumim et al. | 55/DIG. 17 |
| 2,866,519 | 12/1958 | Hazlett et al. | 55/218 |
| 3,180,072 | 4/1965 | Rapp | 55/DIG. 17 |
| 3,890,122 | 6/1975 | Frantz | 55/218 X |
| 3,934,990 | 1/1976 | Ide, III | 55/218 |
| 4,052,178 | 10/1977 | Frantz | 55/218 X |
| 4,361,425 | 11/1982 | Hata | 55/218 |
| 4,487,617 | 12/1984 | Dienes et al. | 55/DIG. 17 |
| 4,544,385 | 10/1985 | Tanaka | 55/218 X |

FOREIGN PATENT DOCUMENTS 57-47056 10/1982 Japan .

*Primary Examiner*—Richard L. Chiesa
*Attorney, Agent, or Firm*—Kane, Dalsimer, Kane, Sullivan and Kurucz

[57] ABSTRACT

An air dryer unit includes an air storage tank including an elongated hollow body of a one-piece construction having a partition wall disposed therewithin to divide the interior of the tank body into a first chamber and a second chamber in an air-tight manner. The second chamber has an outlet connectable to a pneumatic circuit. An opening is formed through that portion of the tank body defining the first chamber. An air dryer device includes a dryer including a tubular housing containing a desiccant and extending through the opening into the first chamber, and a hollow cover member detachably coupled to the dryer housing to cover that portion of the dryer housing extending outwardly through the opening. The cover member is detachably coupled to outer surface of the tank body and has an inlet connectable to an air compressor. One end of the dryer housing disposed in the first chamber communicates with the first chamber while the other end communicates with the cover member. Compressed air from the air compressor is introduced into the inlet and passed through the cover member and the dryer housing into the first chamber. Means is provided for communicating the first chamber with the second chamber for flowing the compressed air from the first chamber to the second chamber. A check valve is associated with the communicating means to prevent a backflow of the compressed air from the second chamber to the first chamber.

5 Claims, 4 Drawing Figures

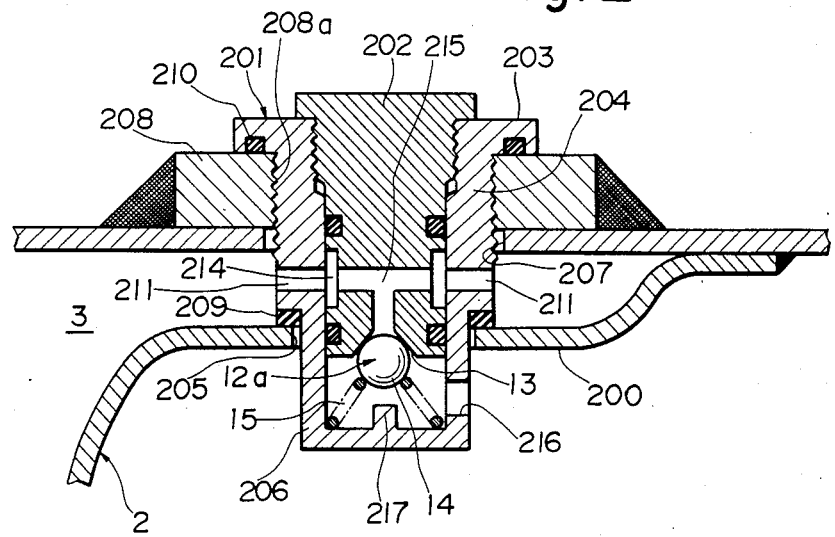
Fig. 2
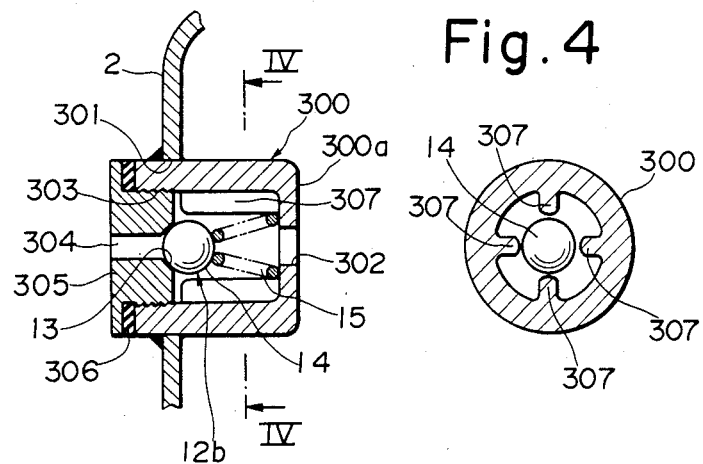
Fig. 3
Fig. 4

AIR DRYER UNIT

BACKGROUND OF THE INVENTION

1. Field of the invention

This invention relates to an air dryer unit comprising an air dryer and an air storage tank which unit is adapted for use in a pneumatic circuit for an air brake or the like of a vehicle.

2. Prior Art

Dried compressed air is used for operating a pneumatic circuit. A system for producing such dried compressed air comprises an air dryer device for removing the moisture of compressed air, fed from an air compressor, to dry it, an air tank for storing the dried compressed air, and a purge tank disposed between the air dryer device and the air tank for storing the compressed air for regenerating a desiccant of the air dryer device.

The air dryer device comprises a dryer containing the desiccant for drying the compressed air, and generally the purge tank is vertically mounted on the dryer and connected thereto to provide a unitary construction. Thus, such a construction has a relatively large dimension in the vertical direction. This imposes limitations on a space for accommodating such an air dryer construction. One method of overcoming this difficulty is to provide the air dryer device and the purge tank separately. However, this approach is disadvantageous in that the installation of the air dryer unit requires more time and labor.

There has been proposed in Japanese Utility Model Publication No. 57-47056 an air dryer unit in which the purge tank is provided separately from the air dryer device and in which the purge tank is formed integrally with the air tank. This conventional air dryer unit is still found not entirely satisfactory in the time and labor required for its installation.

SUMMARY OF THE INVENTION

It is therefore an object of this invention to provide an air dryer unit in which an air dryer device, a purge tank and an air tank are combined together to provide a unitary construction of a compact size.

According to the present invention, there is provided an air dryer unit comprising:

(a) an air storage tank including an elongated hollow body of a one-piece construction having a partition wall disposed therewithin to divide the interior of the tank body into a first chamber and a second chamber in an air-tight manner, the second chamber having an outlet connectable to a pneumatic circuit, and an opening being formed through that portion of the tank body defining the first chamber;

(b) an air dryer device comprising a dryer including a tubular housing containing a desiccant and extending through the opening into the first chamber, and a hollow cover member detachably coupled to the dryer housing to cover that portion of the dryer housing extending outwardly through the opening, the cover member being detachably coupled to outer surface of the tank body and having an inlet connectable to an air compressor, one end of the dryer housing disposed in the first chamber communicating with the first chamber while the other end communicates with the cover member, and compressed air from the air compressor being introduced into the inlet and passed through the cover member and the dryer housing into the first chamber;

(c) means for communicating the first chamber with the second chamber for flowing the compressed air from the first chamber to the second chamber; and (d) a check valve associated with the communicating means to prevent a backflow of the compressed air from the second chamber to the first chamber.

The first chamber defining a purge tank, the second chamber defining an air tank, and the air dryer device are formed integrally with one another as a unit. Therefore, the air dryer unit of such a construction can be easily installed on a vehicle or the like. In addition, a conduit system for connecting the air dryer device and the first and second chamber together for the passage of the compressed air can be simplified. Further, the dryer is accommodated within the first chamber, so that the overall size is not unduly increased despite the fact that the above-mentioned parts are combined into a unit. Thus, the air dryer unit is space-saving. Further, since the dryer housing is detachably secured to the tank body through the cover member, the replacement of the desiccant in the dryer housing by a new one can be easily carried out.

BRIEF DESCRIPTION OF THE DRAWINGS

FIG. 2 is a cross-sectional view of a portion of a modified air dryer unit;

FIG. 3 is a cross-sectional view of a portion of another modified air dryer unit; and FIG. 4 is a cross-sectional view taken along the line IV—IV of FIG. 3.

DESCRIPTION OF THE PREFERRED EMBODIMENT OF THE INVENTION

Figure 1:
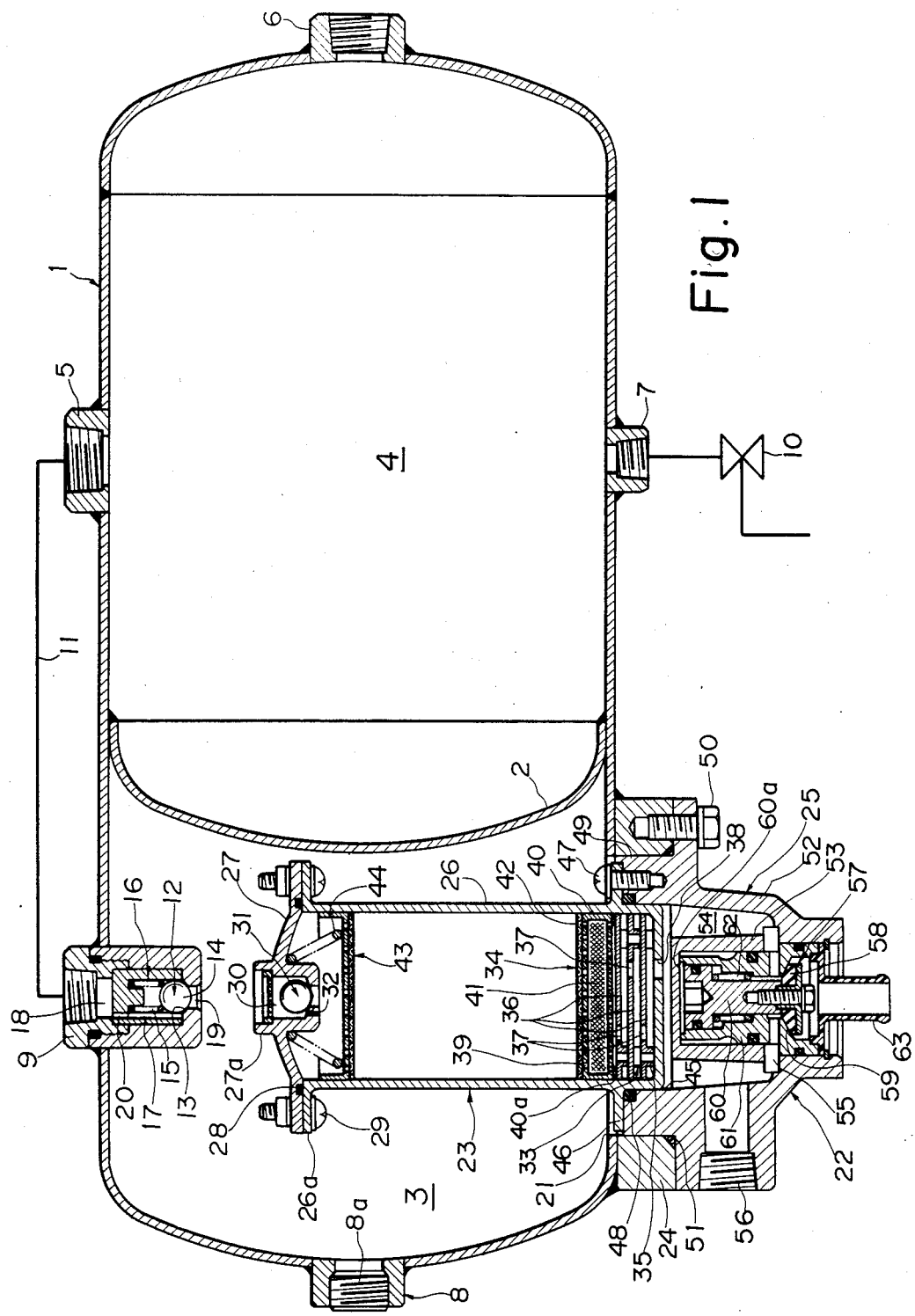
FIG. 1 is a cross-sectional view of an air dryer unit provided in accordance with the present invention.

An air dryer unit shown in FIG. 1 comprises an air storage tank including an elongated hollow body 1 of a one-piece construction, the tank body 1 being made of a steel sheet disposed horizontally. The tank body 1 has a uniform height throughout an entire length thereof and has a pair of rounded ends. A partition wall 2 is disposed within the tank body 1 intermediate the opposite ends thereof to divide the interior of the tank body into a first chamber 3 and a second chamber 4 of a greater volume in an air-tight manner, the partition wall 2 being welded at its periphery to the inner surface of the tank body 1. The partition wall 2 is convex toward the first chamber 3. The first chamber 3 serves as a purge tank while the second chamber 4 of a greater volume serves as an air tank.

Three fittings 5, 6 and 7 are welded to that portion of the tank body 1 defining the air tank 4, and two fittings 8 and 9 are welded to that portion of the tank body 1 defining the purge tank 3. The fitting 6 attached to the end of the air tank 4 serves as an outlet and is connected via a conduit (not shown) to an air brake or the like of a vehicle to supply a compressed air thereto. The fitting 7 attached to the bottom wall of the air tank 4 is connected to a manually-operated cock 10 which is opened to discharge drain liquids and to discharge the compressed air when carrying out the maintenance of the unit. The fitting 5 attached to the top wall of the air tank 4 is connected to the purge tank 3. More specifically, the fitting 5 is connected via a conduit 11 to the fitting 9 attached to the top wall of the purge tank 3. The fitting 9 also serves as a housing for a check valve 12 which prevents the flow of the compressed air from the air tank 4 to the purge tank 3. The fitting 9 has an inlet port 19 formed through a lower end thereof, an outlet 18 and a valve seat 13 formed on the lower end of the fitting 9 adjacent to the inlet port 19. The check valve 12 comprises a hollow elongated guide member 16 having an open bottom and received in the fitting 9, a valve element 14 in the form of a ball received in the guide member 16, and a coil spring 15 acting between the upper end of the guide member 16 and the ball 14 for normally holding the ball 14 into sealing engagement with the valve seat 13. The guide member 16 has a plurality of ribs 17 formed on an inner surface thereof and extending along an axis thereof for guiding the movement of the ball 14 therealong. A port 20 extends through the upper end of the guide member 16 to enable communication between the inlet port 19 and the outlet 18 when the ball 14 is brought out of ingagement with the valve seat 13. A plug 8a is threaded into the fitting 8 attached to the left-hand end (FIG. 1) of the purge tank 3. A safety valve can be attached to the fitting 8 if necessary. The fitting 8 may be omitted.

An opening 21 of a relatively large size is formed through a bottom wall of the purge tank 3. An air dryer device 22 comprises a dryer 23 comprising a tubular housing 26 containing a desiccant (not shown) therein, the dryer casing 26 extending through the opening 21 into the purge tank 3. An annular base 24 for supporting the air dryer device 22 is welded to the outer surface of the bottom wall of the purge tank 3 in surrounding relation to the opening 21.

The air dryer device 22 further comprises a cover member 25 which supports the dryer 23 and serves as a housing for a drain valve 57.

The dryer housing 26 has an open upper end and a closed bottom, and a flange 26a is formed around the upper end of the dryer housing 26. An upper end member 27 of an inverted dish-shape is secured to the upper open end of the dryer housing 26 by screws 29 passing through the flange 26a and the end member 27. A seal ring 28 is interposed between the end member 27 and the flange 26a to provide an air-tight seal therebetween. The upper end member 27 has a central tubular portion 27a in which a ball 31 is received, the tubular portion 27a and the ball 31 constituting a check valve. A bypass port 32 is formed through the lower end of the tubular portion 27a.

A filter unit is mounted within the dryer housing 26 at a lower portion thereof, the filter unit comprising a first filter 33 for removing oil droplets of a relatively large size from the compressed air and a second filter 34 disposed above the first filter 33 for removing oil mist entrained in the compressed air. The first filter 33 comprises a plurality of, for example, three filter plates 36 each having projections 35 on one side thereof and an aperture 37 formed therethrough in eccentric relation to the center thereof. The apertures 37 of the three filter plates 36 are disposed in staggered relation to one another, so that the path of flow of the compressed air through the first filter 33 is increased. In addition, the compressed air passed through the aperture 37 of a lower one of each adjacent filter plates 36, impinges on the lower surface of the upper filter plate 36, so that the oil droplets can efficiently collect on the lower surface of each filter plate 36. With this arrangement, the oil and moisture entrained in the compressed air passing through the first filter 33 can be efficiently removed therefrom. For the same reason, an inlet port 38 formed through the lower end of the dryer housing 26 is disposed in staggered relation to the aperture 37 of the lowermost filter plate 36. The filter plate 36 are of the same size and configuration. Guide portions may be formed on the inner peripheral surface of the dryer housing 26 for holding the filter plates 36 in position, and each filter plate 36 may have recesses in its upper surface for receiving the respective projections 35 of the adjacent filter plate 36 disposed thereabove for registration or positioning purposes.

The second filter 34 comprises a casing 40 having a plurality of apertures 39 formed through each of upper and lower walls thereof, and a filter element 41 of ceramics material received in the casing 40. A spacer ring 40a is interposed between the uppermost filter plate 36 of the first filter 33 and the casing 40 of the second filter 34 to provide a space therebetween. The spacer ring 40a may be formed integrally with either the casing 40 or the filter plate 36. The second filter 34 efficiently arrests the oil mist or the like in the compressed air which the first filter 33 has failed to arrest. A lower air-permeable plate 42 is placed on the second filter 34, and the desiccant (not shown) in the form of granules is filled in the dryer housing 26 between the lower air-permeable plate 42 and an upper air-permeable plate 43. A coil spring 44 acts between the upper end member 27 and the upper air-permeable plate 43 for holding the desiccant against movement.

The dryer 23 is provided as a unit, and therefore the desiccant can be easily replaced by a new one. The housing 26 of the dryer 23 is received in a central bore 45 of the cover member 25 at a lower end thereof, with a peripheral flange 46 resting on the upper surface of the cover member 25, and the housing 26 is secured to the cover member 25 by screws 47 passing through the flange 46 into the cover member.

The cover member 25 has at its upper portion a tubular portion 49 which is fitted in the annular base 24, and the cover member 25 is secured to the annular base 24 by screws 50. A seal ring 51 is interposed between the annular base 24 and the cover member 25. With this construction, the dryer housing 26 can be easily detached from the storage tank body 1 by removing the screws 50 and 47 for replacement of the desiccant by a new one.

The cover member 25 includes a tubular body 52 of which upper portion constitutes the above-mentioned tubular portion 49. An inner tubular portion 53 having a closed top is formed integrally with the tubular body 52 and disposed therewithin in coaxial relation thereto, the inner tubular portion 53 serving as a housing or body for the drain valve 57. An annular space 54 is formed between the inner tubular portion 53 and the tubular body 52. Thus, the annular space 54 is part of the central bore 45 of the cover member 25. The interior of the inner tubular portion 53 communicates with the annular space 54 through ports 55 formed through the lower end of the inner tubular portion 53. The tubular body 52 has an inlet port 56 through which the compressed air is fed from the air compressor into the cover member 25. The compressed air introduced into the inlet port 56 contains oily materials such as lubricating oil for the compressor as well as moisture and is relatively hot. The double wall construction of the cover member 25 defined by the tubular body 52 and the inner tubular portion 53 is suited for receiving such a compressed air. Relatively large water droplets and oil droplets collect on the walls defining the space 54 when the compressed air passes through the space 54, so that a considerable proportion of the moisture and oil entrained in the compressed air are removed therefrom. Another advantage of the double wall construction is that the space 54 through which the hot compressed air passes serves to prevent the drain valve from being subjected to freezing in cooperation with a built-in heater (not shown) when the air dryer unit is used in cold climates.

The drain valve 57 functions to discharge drain liquids resulting from the moisture and oil entrained in the compressed air and also to discharge the air, fed from the purge tank 3 through the dryer housing, to regenerate the desiccant contained in the dryer housing 26. The drain valve 57 comprises an elongated plug 61 received in the inner tubular portion or valve body 53, a control piston 60 received in the plug 61 for movement therealong, a valve element 58 of an elastic material carried by the control piston 60 at a lower end thereof, and a coil spring 62 acting between the control piston 60 and the plug 61 for normally holding the valve element 58 into sealing contact with a tapered valve seat 59, formed on a lower portion of the plug 61, to close the drain valve 57. A pneumatic signal is adapted to be applied from a pressure governor (not shown) via a passage (not shown) in the cover member 25 to a pressure-receiving portion 60a on the upper end of the control piston 60. When the pneumatic signal is applied to the pressure-receiving portion 60a, the control piston 60 is urged downwardly against the bias of the coil spring 62 to bring the valve element 58 out of engagement with the valve seat 59 to open the drain valve 57. The drain liquids are discharged from a tube 63 attached to the lower end of the tubular body 52 when the drain valve 57 is opened.

According to a modified form of the invention shown in FIG. 2, the fitting 5 and 9 and the conduit 11 are omitted, and the check valve 12 is replaced by a check valve 12a. That portion of the partition wall 2 adjacent to its upper end is disposed parallel to the upper wall of the purge tank 3 to provide a mounting portion 200. The check valve 12a comprises a tubular housing 201, and a plug 202 received in the tubular housing 201 and threadedly engaging therewith at an upper portion thereof. The tubular housing 201 has an upper portion 204 having a flange 203 at its upper end, and a lower portion 206 of a reduced diameter extending through an aperture 205, formed through the mounting portion 200, into the air tank 4. An aperture 207 is formed through the upper wall of the purge tank 3 and is aligned with the aperture 205. A mounting ring 208 is welded to the outer surface of the upper wall of the purge tank 3 in surrounding 5 relation to the aperture 207. The mounting ring 208 has at its inner peripheral surface internal threads 208a engaging external threads of the upper portion 204 of the tubular housing 201. A seal ring 210 is provided for forming a seal between the flange 203 and the mounting ring 208. An annular gasket 209 is also provided for forming a seal between the housing 201 and the mounting portion 200. The purge tank 3 communicates with the air tank 4 through ports 211 formed in the upper portion 204, an annular recess 214 formed in the outer surface of the plug 202, a T-shaped passage 215 formed within the plug 202 and a port 216 formed through the lower portion 206. The check valve 12a further comprises a ball 14 and a coil spring 15 urging the ball 14 against a valve seat 13. A projection 217 is formed on the bottom of the housing 201 for limiting the downward movement of the ball 14. With this construction, the check valve 12a can be easily replaced by a new one from outside of the tank body 1.

According to another modified form of the invention shown in FIGS. 3 and 4, the fittings 5 and 9 and the conduit 11 are omitted, and the check valve 12 is replaced by a check valve 12b mounted on the partition wall 2. A tubular housing 300 of the check valve 12b extends through an aperture 301, formed through the partition wall 2, and is welded to the partition wall 2. The housing 300 has an aperture 302 formed through an end wall 300a thereof, and internal threads 303 formed in its inner surface adjacent to an open end thereof. A plug 305 is threaded into the housing 300, the plug 305 having a central port 304. A seal ring 306 is provided for forming a seal between the housing 300 and the plug 305. The check valve 12b further comprises a ball 14 and a coil spring 15 urging the ball 14 against a valve seat 13 formed in the plug 305. A plurality of ribs 307 are formed on the inner surface of the housing 300 and extend along an axis thereof. The ribs 307 serve to guide the movement of the ball 14. The check valve 12b is accessible through the opening 21 when the air dryer device 22 is removed from the tank body 1.

What is claimed is:

1. An air dryer unit adapted for use in a pneumatic circuit of a vehicle, comprising:
    (a) an air storage tank including an elongated hollow body of a one-piece construction which is disposed horizontally, having a partition wall disposed therewithin to divide the interior of said tank body into a first chamber and a second chamber in an air-tight manner, said second chamber having an outlet connectable to a pneumatic circuit, and an opening being formed at the bottom of the tank body and surrounded by an annular base, said annular base being fixed to the bottom wall of the tank;
    (b) an air dryer device comprising a dryer including a tubular dryer housing containing a desiccant and extending through said opening into said first chamber, and a hollow cover member detachably coupled to said dryer housing to cover that portion of said dryer housing extending outwardly through said opening, said cover member being detachably coupled to an outer surface of said tank body and having an inlet connectable to an air compressor, said cover member having at its upper portion a tubular portion which defines a central bore, the tubular portion being fit into said annular base wherein tubular housing of the dryer is received in the central bore of the cover member at a lower end thereof, one ene of said tubular dryer housing communicating with said first chamber while the other end communicates with said cover member, and compressed air from said air compressor being introduced into said inlet and passed through said cover member and said tubular dryer housing into said first chamber;
    (c) means for communicating said first chamber with said second chamber for flowing the compressed air from said first chamber to said second chamber; and
    (d) a check valve associated with said communicating means to prevent a backflow of the compressed air from said second chamber to said first chamber.

2. An air dryer unit according to claim 1, in which said air dryer device comprises a drain valve accommodated within said cover member, said cover member having a tubular body and an inner tubular portion disposed within said tubular body in such a manner to provide an annular space therebetween, said inlet being formed in said tubular body and communicating with said space, and said inner tubular portion constituting a valve body for said drain valve.

3. An air dryer unit according to claim 1, in which the volume of said first chamber is smaller than that of said second chamber.

4. An air dry unit according to claim 1, in which said check valve comprises a tubular valve housing extending through said partition wall and said tank body, one end of said tubular valve housing disposed exteriorly of said tank body being open, a plug being secured to said one end of said tubular valve housing to close it.

5. An air dryer unit according to claim 1, in which said check valve comprises a tubular valve housing which extends through said partition wall.

* * * * *